H. L. LONGLEY.
BRAKE.
APPLICATION FILED APR. 28, 1915.

1,184,545.

Patented May 23, 1916.

Witnesses.
E. P. Ruppert
John J. McCarthy

Inventor
H. L. Longley
By Victor J. Evans
Attorney

UNITED STATES PATENT OFFICE.

HARRY L. LONGLEY, OF EVANSTON, ILLINOIS.

BRAKE.

1,184,545.  Specification of Letters Patent.  Patented May 23, 1916.

Application filed April 28, 1915. Serial No. 24,607.

*To all whom it may concern:*

Be it known that I, HARRY L. LONGLEY, a citizen of the United States of America, residing at Evanston, in the county of Cook and State of Illinois, have invented new and useful Improvements in Brakes, of which the following is a specification.

This invention relates to improvements in brakes and has particular application to brakes of that type known as internal expanding band brakes.

In carrying out the present invention, it is my purpose to improve and simplify the general construction of internal expanding band brakes and to provide a brake whereby the maximum braking power may be derived with a minimum of labor on the part of the operator and which will embody comparatively few parts and these so correlated and arranged as to reduce the possibility of derangement to a minimum.

With the above and other objects in view, the invention consists in the construction, combination and arrangement of parts hereinafter set forth in and falling within the scope of the claim.

Figure 1:
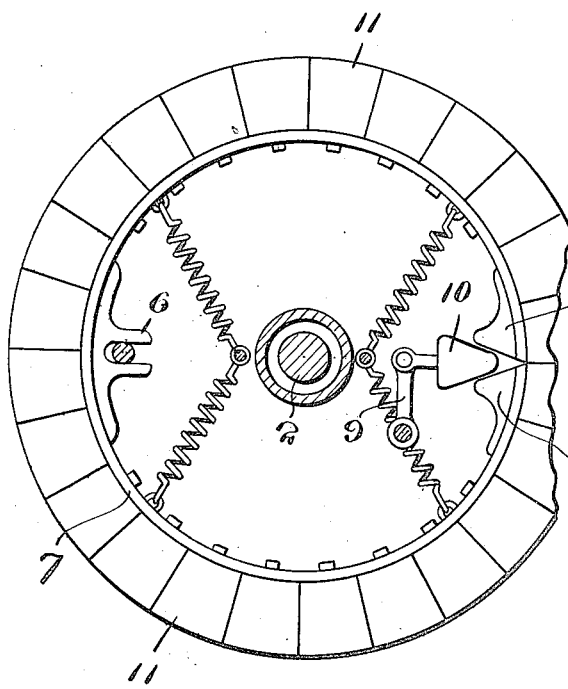
Figure 2:
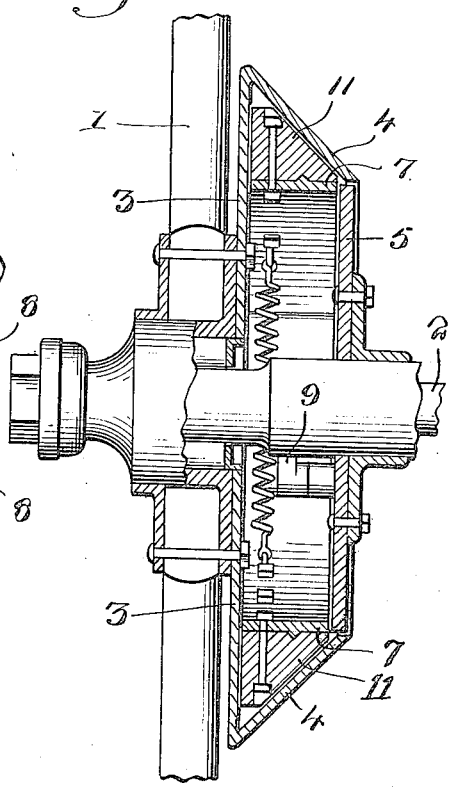
Figure 3:
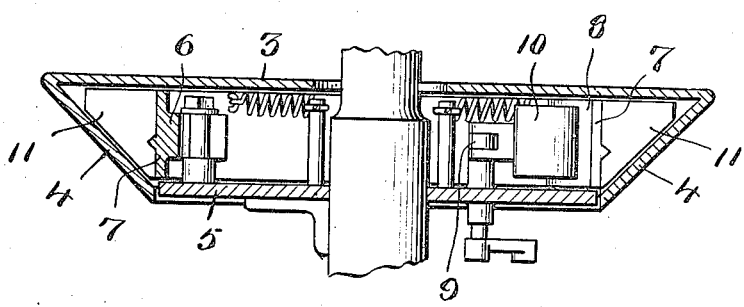

In the accompanying drawing: Figure 1 is a view in side elevation of an internal expanding band brake constructed in accordance with the present invention. Fig. 2 is a vertical transverse sectional view through the same, the brake being shown as applied to a wheel. Fig. 3 is a horizontal sectional view through the brake.

Referring now to the drawing in detail, 1 designates one of the driving wheels of a motor vehicle keyed upon one end of the driving axle 2. Fixed to the inner side of the drive wheel 1 and of a diameter less than that of the driving wheel 1 is a disk 3 disposed concentrically of the axle 2 and formed on the periphery of the disk 3 and extending toward the center of the axle 2 is a frusto-conical flange 4. Surrounding the housing of the axle 2 concentrically thereof and suitably secured thereto is a disk 5 spaced apart from the disk 3 and disposed within the relatively small end of the frusto-conical flange 4. Secured to the inner surface of the disk 5 adjacent to the periphery thereof is a bracket 6 and fastened to the bracket 6 is a circular brake band 7. This brake band 7 is split at a point diametrically opposite the bracket 6 and secured to the inner surface of the brake band at opposite sides of the split portion are wedge blocks 8, while pivotally connected to the inner surface of the disk 5 adjacent to the blocks 8 is a lever 9 carrying a spreader wedge block 10 adapted, in the movement of the lever 9, to enter the space between the wedge blocks 8, 8 and so force the latter apart and expand the brake band. Bolted or otherwise secured to the outer surface of the brake band 7 are shoes 11 corresponding in shape to the formation of the space between the disk 3 and flange 4 and adapted to enter such space and frictionally engage the proximate walls of the disk 3 and flange 4 when the brake band is expanded under the action of the wedge block 10. Each shoe 11 is preferably, although not necessarily, formed of wood and the shoes are fastened to the brake band in such manner that the grain of the wood extends transversely of the friction surfaces of the disk 3 and flange 4, thereby prolonging the life of the shoes. Coiled retractile springs 12 have the outer ends thereof secured to the inner surface of the band 7 at opposite sides of the split in the band and the inner ends secured to the inner surface of the disk 5 and these springs act to contract the brake band 7 and so hold the shoes 11 out of engagement with the friction surfaces of the disk 3 and flange 4. In practice, when it is desired to check the speed of the wheel 1 the lever 9 is actuated to slide the separator block 10 into the space between the wedge blocks 8, thereby separating the last-mentioned blocks and expanding the brake band 7 to engage the shoes 11 with the friction surfaces of the disk 3 and flange 4. It will be observed that the brake shoes 11 engage the two friction surfaces, thereby doubling the efficiency and effectiveness of the brake over the present construction of internal expanding band hub brakes.

While I have herein shown and described the preferred form of the invention by way of illustration, I wish it to be understood that I do not limit or confine myself to the precise details of construction herein described and delineated as modification and variation may be made within the scope of the claim without departing from the spirit of the invention.

I claim:

An internal expanding band brake comprising a disk fastened to the wheel or other rotatable element, a frusto-conical element on the periphery of said disk and having the relatively small end thereof spaced apart from the disk, a stationary disk secured to the axle housing and disposed within the relatively small end of said frusto-conical flange and spaced apart from the first-named disk, a split brake band between said disks, a connection between said brake band and stationary disk at a point diametrically opposite the split portion of the band brake, shoes carried by said band and conforming to the shape of the space between said movable disk and frusto-conical flange and adapted to engage the adjacent portions of said disk and flange when said brake band is expanded, and means for expanding said brake band.

In testimony whereof I affix my signature in presence of two witnesses.

HARRY L. LONGLEY.

Witnesses:
E. WILL,
F. E. DREYER.